April 23, 1963

LOUISE A. KANTROWITZ
NOW BY CHANGE OF NAME
LOUISE A. KAY
TALKING BOOK 3,086,297

Filed Aug. 21, 1961

INVENTOR.
LOUISE A. KANTROWITZ
BY
Robert A. Drenham
ATTORNEY

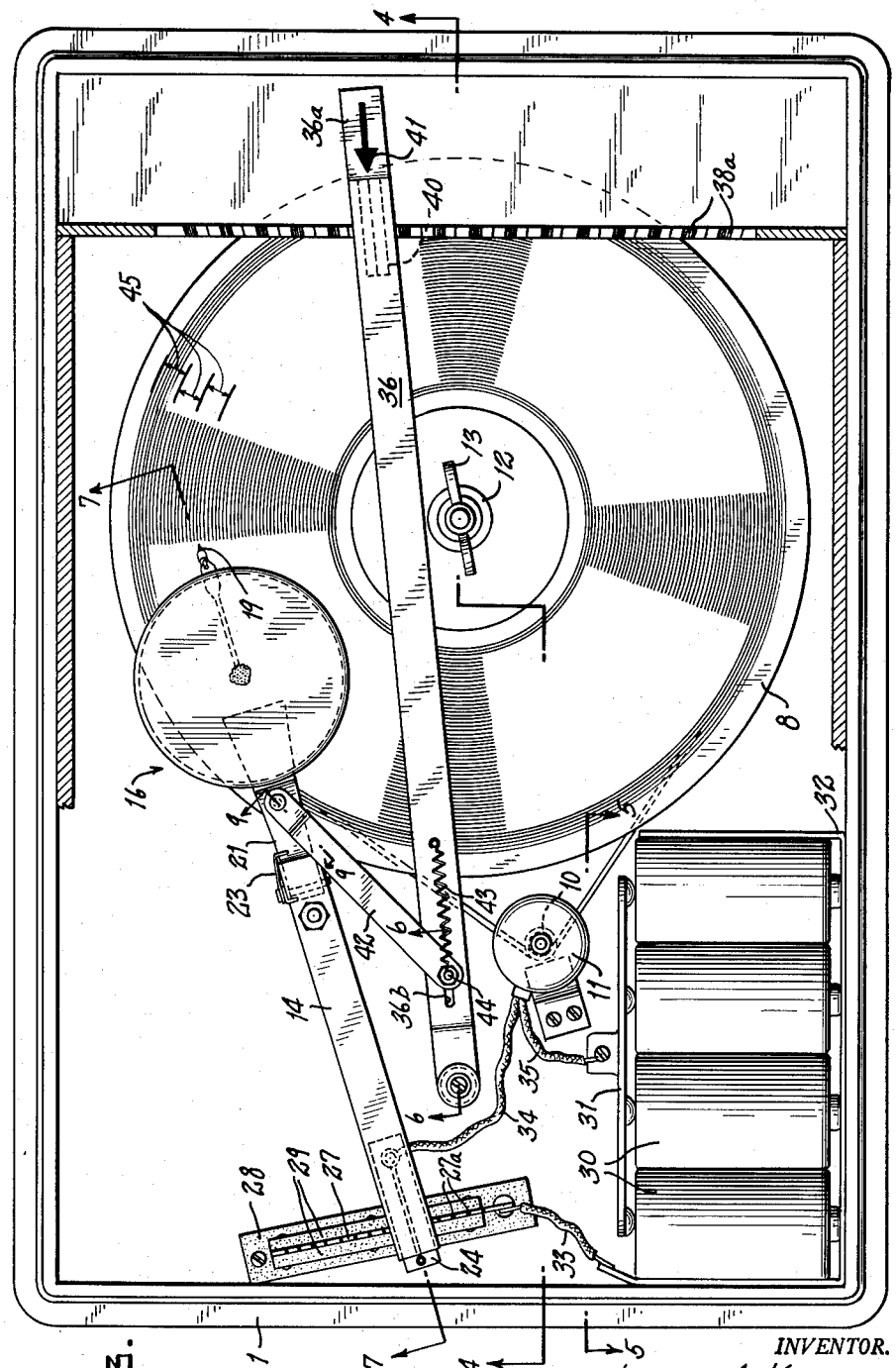

April 23, 1963
LOUISE A. KANTROWITZ
NOW BY CHANGE OF NAME
LOUISE A. KAY
TALKING BOOK
3,086,297
Filed Aug. 21, 1961
4 Sheets-Sheet 3
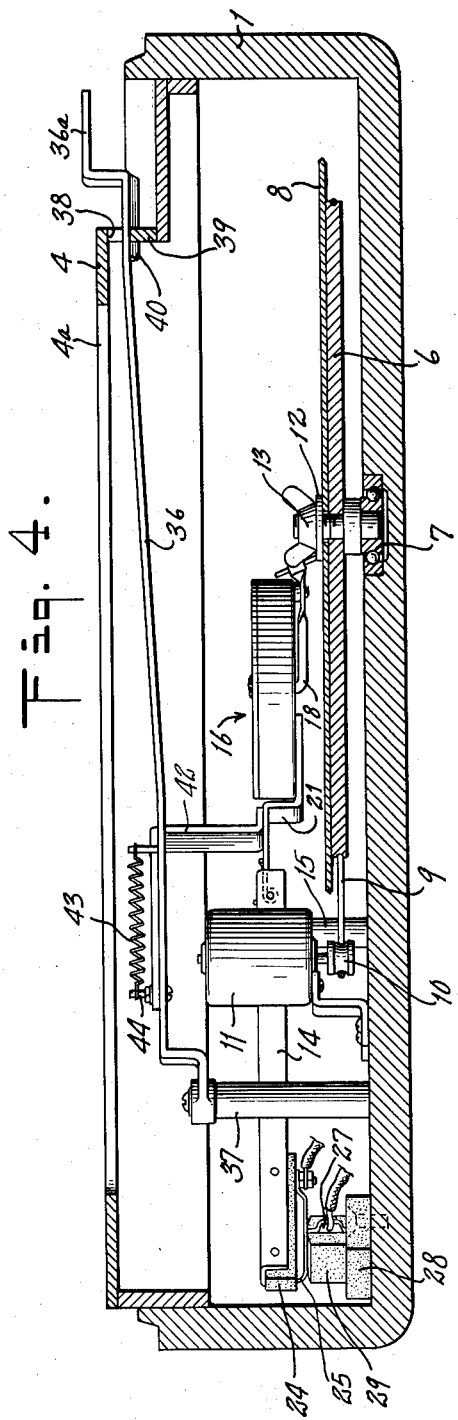
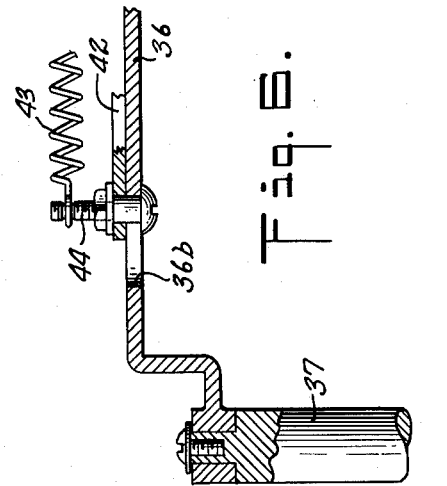
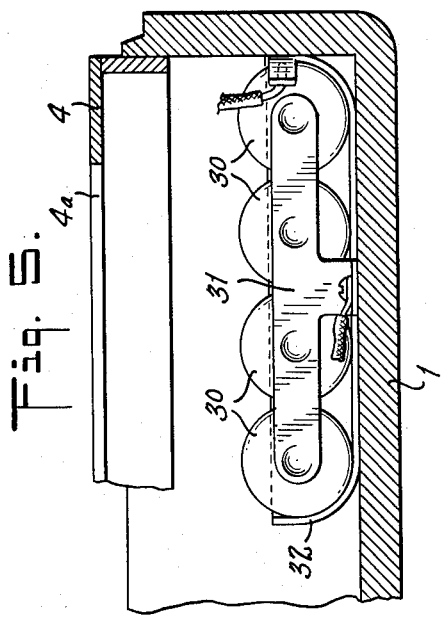
INVENTOR.
LOUISE A. KANTROWITZ
BY
Robert A. Dunham
ATTORNEY April 23, 1963
LOUISE A. KANTROWITZ
NOW BY CHANGE OF NAME
LOUISE A. KAY
TALKING BOOK
3,086,297
Filed Aug. 21, 1961
4 Sheets-Sheet 4
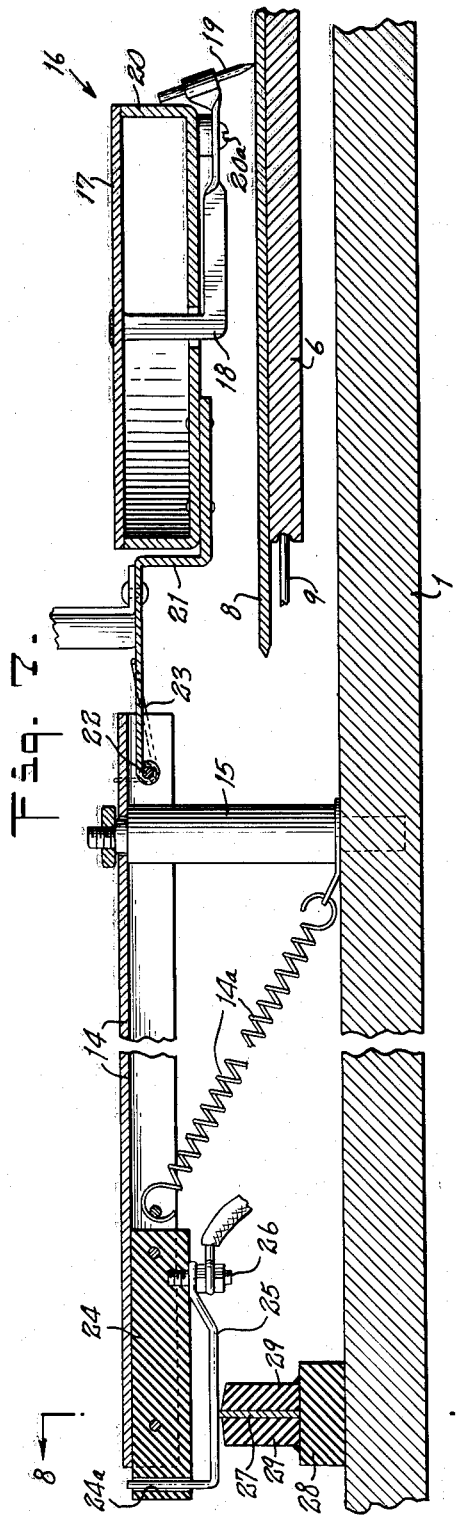
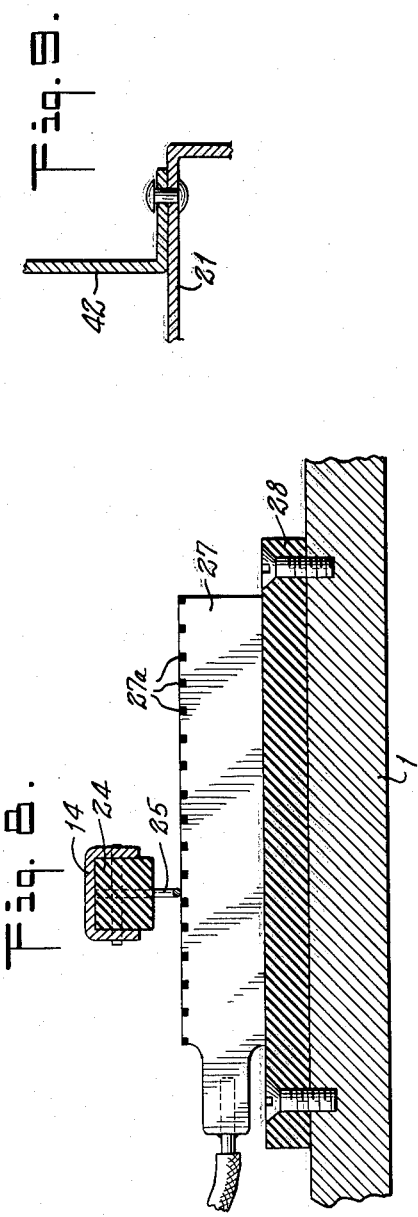
INVENTOR.
LOUISE A. KANTROWITZ
BY Robert A. Dunham
ATTORNEY United States Patent Office 3,086,297
Patented Apr. 23, 1963

3,086,297
TALKING BOOK
Louise A. Kantrowitz, now by change of name,
Louise A. Kay, West Hartford, Conn.
Substituted for abandoned application Ser. No. 392,585, Nov. 17, 1953. This application Aug. 21, 1961, Ser. No. 135,403
10 Claims. (Cl. 35—35)

This invention relates to sound reproducing apparatus adapted for coordination with other intelligence bearing media.

In the specific embodiment disclosed herein the sound reproducing apparatus is coordinated with a printed book so that the words or other intelligence in the book may be visually sensed by an observer listening to coordinated intelligence from the sound reproducing apparatus. The sound reproducing apparatus may with equal facility be coordinated with other visual or tactual media of information. For example, the book may be printed in Braille so that it may be used by a blind person.

The embodiment of the invention disclosed herein is intended primarily as an educational or amusement device for children. Certain structural features of the invention are of particular utility in connection with devices of this specific type. Other features are of broader utility in connection with other fields of application of the invention.

It has previously been proposed to coordinate sound reproducing apparatus with a printed index of the material on the sound record, so that particular portions of the material could be selected for reproduction. Such mechanisms of the prior art have been rather complex in construction and operation. Indeed, their operation has been far beyond the capabilities of a pre-school child who is unfamiliar with alphabetical or numerical characters. Furthermore, none of the prior art devices have been adapted for coordination with a book.

An object of the present invention is to provide an improved sound reproducing apparatus adapted for coordination with other intelligence bearing media sensible by sight or touch.

Another object of the invention is to provide sound reproducing apparatus adapted for coordination with a book.

A further object of the invention is to provide sound reproducing apparatus with improved and highly simplified control mechanism. Another object is to provide such apparatus in which the control mechanism is actuated by a single manual control member.

Another object is to provide an improved sound reproducing apparatus which is portable and which may be operated in any angular position without being disturbed by the effects of gravity.

Another object of the invention is to provide an improved book coordinated with the sound reproducing apparatus of the type described and its control mechanism.

Another object is to provide sound reproducing apparatus of the type described which is sufficiently simple and rugged to be used by very young children.

Another object is to provide an improved book structure for use in the apparatus of the type described. Another object is to provide an improved book and sound record structure coordinated with each other for use in sound reproducing apparatus of the type described.

The foregoing objects are attained in the embodiment of the invention disclosed herein by providing a portable casing, generally similar in form to a suitcase, with a mounting for a book on one of the large sides of the casing, which one side normally serves as the top. A turntable for driving a sound record of the conventional disc type is located inside the casing, together with a suitable motor mechanism for driving the turntable. The control mechanism for the turntable includes a lever having an extended end projecting through the top of the casing adjacent one edge of the book. This extended end of the lever may be positioned along the edge of the book in coordination with an index printed on the adjacent marginal portion of the book pages.

The motor which drives the turntable is electric, and is controlled in accordance with the position of the pick-up head as it moves across the disc.

The manual control lever is resilient, and is self-biased to engage one of a series of notches which corresponds to the pages of the book. The words recorded on the sound track of the record are recorded in sections separated by blank portions. Each section of the record between the two blank portions likewise corresponds to a page or pages of the book.

A connecting link is provided between the manual control lever and pick-up head so that the pick-up head is lifted from the disc whenever the lever is lifted out of its notches. The pick-up head may then be moved laterally across the disc by manipulation of the lever so as to select the particular portion of the record to be reproduced. A lost motion connection, spring loaded to a normal position, is provided between the lever and the pick-up head to permit movement of the pick-up head as the record turns while the lever remains in its notch.

The pick-up head is biased to a record-engaging position by means of a spring. Suitable means is provided for clamping the record down against the turntable. Another clamp is provided for holding the book against the suitcase, which is adapted for carrying by a handle of the usual suitcase type. Since the record, the book, and the pick-up head are all in a fixed position, the case may be moved angularly to any position without disturbing the operation of the sound producing apparatus.

Other objects and advantages of the invention will become apparent from consideration of the following specification, taken together with the accompanying drawings:

In the drawings:

FIG. 3 is a plan view of the apparatus of FIG. 1, with the book removed and with certain other parts broken away or shown in section;

FIG. 4 is a vertical sectional view taken on line 4—4 of FIG. 3 looking in the direction of the arrows;

FIG. 5 is a vertical sectional view taken along the line 5—5 of FIG. 3.

FIG. 6 is a fragmentary sectional view, on an enlarged scale, taken on line 6—6 of FIG. 3 looking in the direction of the arrows;

FIG. 7 is a fragmentary sectional view taken on line 7—7 of FIG. 3, on an enlarged scale;

FIG. 8 is a cross-sectional view taken on line 8—8 of FIG. 7;

FIG. 9 is a cross-sectional view taken on line 9—9 of FIG. 3.

Figure 1:
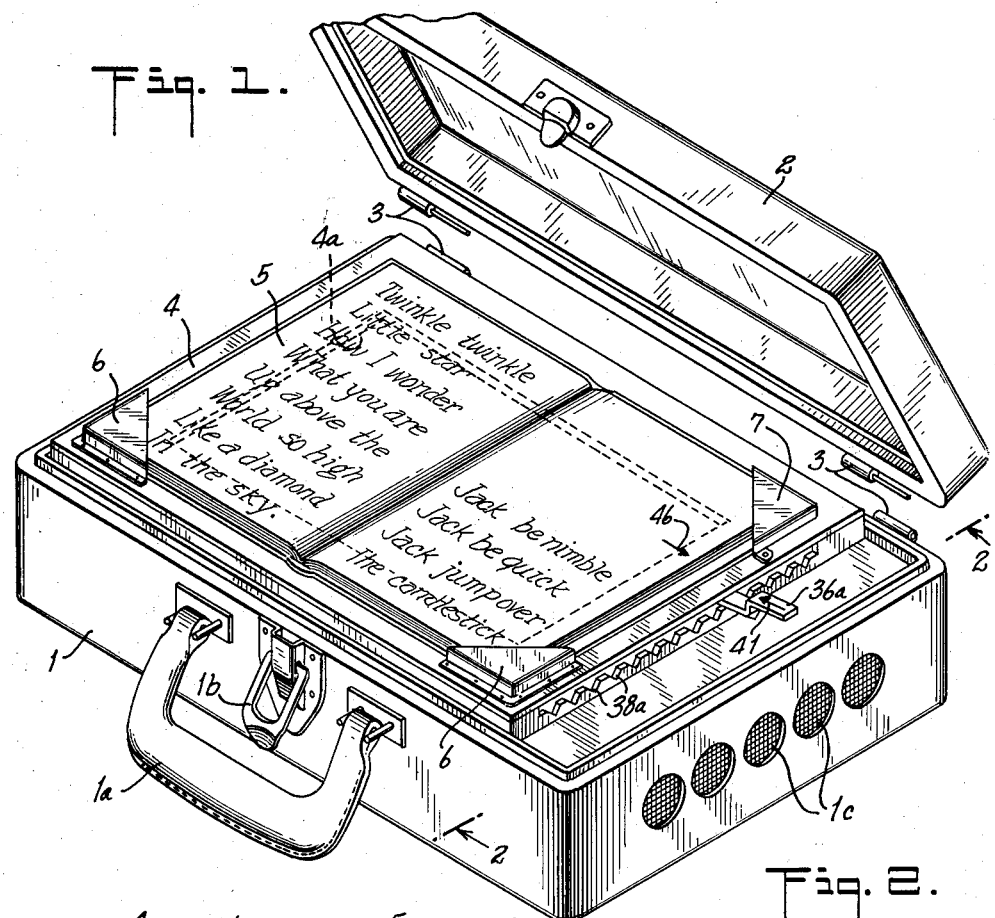
FIG. 1 is an orthographic projection of a sound reproducing apparatus constructed in accordance with the invention.
Figure 2:
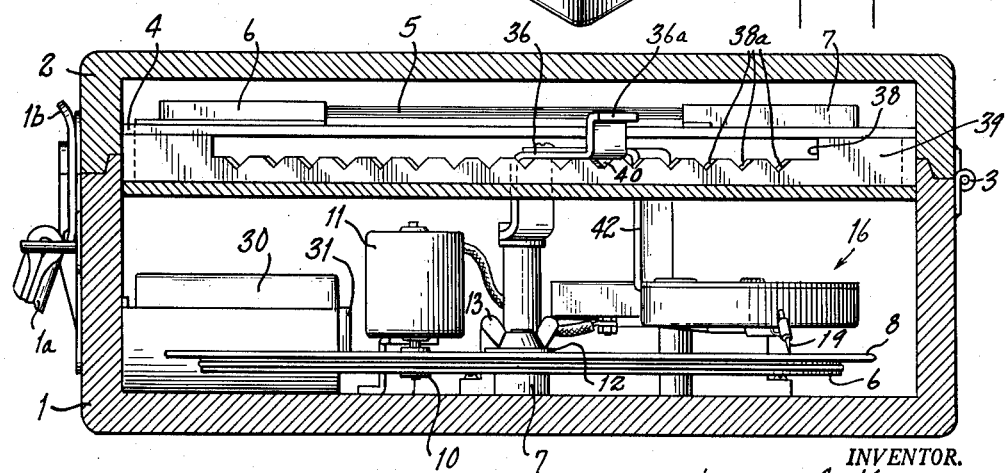
FIG. 2 is a vertical cross-sectional view taken on line 2—2 of FIG. 1, looking in the direction of the arrows.

Referring to the drawings, there is shown a casing 1 having a removable cover 2, the casing and cover being provided with separable hinge structure 3. The casing 1 may be described as a portable casing of the suitcase type, having a carrying handle 1a, a latch 1b, and screened openings 1c in one end to permit the egress of sound.

On top of the casing 1, as it appears in FIG. 1, there is provided a platform 4 for the mounting of a book 5. Two fixed corner braces 6 are provided for the lower corners of the book and a releasable corner brace 7 is provided for at least one of the upper corners, so that the book is firmly held in place, but the pages may nevertheless be readily turned.

The platform 4 is provided with a large central opening 4a through which access may be had to the interior of the casing 1 when the book is removed.

Inside the casing 1, there is provided a turntable 6 journaled in the bottom of the casing by means of a suitable bearing 7. The turntable 6 is adapted to support a suitable disc record 8, and is driven by a belt 9, which passes over a suitable groove in the periphery of the turntable 6 and also around a pulley 10 driven by motor 11.

The record 8 is held in place on the turntable 6 by means of a central washer 12 and wing nut 13. If the turntable is constructed to turn clockwise, as is conventional, the nut 13 should have a left-hand thread in order to minimize any tendency for the nut to loosen as the turntable rotates.

An arm 14 is pivoted on a post 15, as best seen in FIG. 7. On its right-hand end the arm 14 supports a pick-up unit generally indicated at 16 and including a diaphragm 17 fixed at its edges on a cylindrical sound box 20 and having its center attached to one end of a vibration transmitting member 18 which extends downwardly from the diaphragm through an aperture in the lower wall of the box 20. Outside the box 20, the member 18 is bent at right angles and is fastened to the box 20 by a screw 20a. At the right of screw 20a, member 18 carries at its end a needle or stylus 19 adapted to engage the record 8. The sound box 20, supported on the end of a lever 21 is pivotally connected to the arm 14 by means of a pivot pin 22. A coil spring 23, associated with the pivot pin 22, biases the lever 21 downward, as it appears in FIG. 7, to hold the needle 19 in engagement with the record.

The present invention is not limited to the specific sound reproducing structure illustrated. This sound reproducing structure is chosen for the present device because of its simplicity and ruggedness, both of which characteristics are highly desirable in a device intended to be operated by young children. No electrical amplication is provided, nor any mechanical amplification other than that afforded by the simple resonant sound box 20. The educational or amusement device disclosed is intended primarily for the benefit of a person who is watching the book at the same time the sound is being reproduced. Consequently, it is not necessary for the sound to have large volume since the person primarily interested will be close to the device if he is watching the book. Furthermore, if amplification were provided, a young child operating the device might turn up the volume to a degree objectionable to other persons nearby.

It will be readily understood by those skilled in the art that the invention in its broader aspects is readily applicable to devices other than the children's educational and amusement device illustrated, and that in such other devices, more elaborate sound reproducing arrangements, including, for example, electrical amplifiers, may be desirable.

The end of the arm 14 opposite the pick-up unit 16 supports an insulating block 24 on which is mounted a light spring contact finger 25. The contact finger 25 is attached at its right-hand end to a binding post 26 fastened in the block 24. The free end of the finger 25 is received freely in a suitable guide aperture 24a in the block 24.

The spring contact finger 25 rides along the top of a stationary contact plate 27 suitably supported by a base insulator 28 and side insulating members 29 and having in its upper surface spaced recesses 27a, which are preferably filled with insulating material. It will be appreciated that the contact finger 25 completes an electric circuit through the contact plate 27, except when it is riding on one of the insulating recesses 27a.

A spring 14a is provided to ensure that finger 25 always contacts the plate 27, even under severe conditions of vibration.

Power for the motor 11 is supplied from a set of small standard flashlight batteries 30 (FIG. 3), which are retained between spring contact plates 31 and 32. Contact plate 32 is connected through a wire 33 to the stationary contact plate 27. Spring contact finger 25 is connected through bindings post 26 and a wire 34 to the motor 11, and the motor circuit is completed through a wire 35 extending between motor 11 and the battery supporting plate 31. Although the batteries are shown as being connected in parallel, it will readily be understood that other circuit arrangements may be used.

A manual control lever 36 is pivoted at its left-hand end on a post 37, as best seen in FIG. 4. The lever 36 extends from the post 37 to the right across the casing 1 and out through a slot 38 formed in a vertical plate 39 which supports the right-hand end of the platform 4. The slot 38 is provided at its lower surface with a series of notches 38a (see FIG. 1). The under side of the lever 36 is provided adjacent the plate 39 with a V-shaped lug 40 which is adapted to fit in the notches 38a. The lever 36 is formed of yieldable material, self-biased to hold the lug 40 in engagement with one of the notches 38a. Outside of the slot 38 the lever 36 is provided with an upwardly-extending off-set extension 36a. On the upper surface of this extension there is formed an index member of suitable contour, shown as an arrowhead 41.

The lever 36 is connected to the lever 21 which supports the pick-up unit 16 by means of a link 42. The connection between link 42 and lever 21 is a simple pivot, shown in FIG. 9. The connection between link 42 and lever 36 is a pin-and-slot connection including a pin 44 fixed in link 42 and moving in a slot 36b in lever 36, which allows lost motion between the pick-up head 16 and the lever 36. A spring 43 is connected in tension between the lever 36 and the pin 44, so that it tends to take up the lost motion in the pin-and-slot connection.

The record 8 is divided, as indicated in FIG. 3, into annular sections 45, each of which corresponds to one page, or one pair of facing pages, in the book 5. The beginning and end portions of each of the sections 45 are left blank, that is, without any sound recorded, to provide space along the sound track for the starting and stopping of the record 8.

Along the right-hand margin of each right-hand page of the book is provided an index 46, shown in the form of an arrowhead. The position of each index 46 is co-ordinated with the position on the record 8 of the corresponding annular section 45. By placing the lever 36 in a position such that its arrowhead 41 is aligned with the arrowhead 46 on the page of the book, the pick-up unit 16 is moved to a position where the needle 19 is aligned with the beginning of the record section 45 where the corresponding material on the sound track of the record is reproduced. Typically, the words on the sound track will be identical with the words printed in the book, but it will be readily understood that this identity relationship is not a necessary limitation of the invention.

Although the apparatus illustrated uses a conventional disc record, it will be readily understood that the invention is not necessarily limited to this particular type of record structure. Only very slight modifications of structure would be necessary to adapt the invention to the use of a cylindrical record, either of the rigid type or of the flexible plastic sleeve type. Furthermore, by a somewhat more elaborate adaptation, the invention could be readily applied to magnetic tape recordings of various types.

*Operation*

When placing the apparatus in operation, the book 5 is removed from the platform 4, allowing access to batteries 30 and record 8 through the opening 4a. Batteries 30 are inserted or replaced if necessary, and a record 8 is attached to the turntable 6 by means of the wing nut 13. The book is then placed on the platform 4 and clamped in place. The material printed on any page of the book may now be reproduced by setting the lever extension 36a in an angular position with its arrowhead 41 aligned with the arrowhead 46 on the selected page. In order to move the lever extension 36a to line up the arrowheads, the lever extension must first be lifted to get the lug 40 out of the notch 38a in which it rests. When lever 36 is so lifted, the link 42 is likewise lifted and in turn lifts the lever 21 and the pick-up unit 16 so that the needle 19 is free of the record and may move across it without dragging across the grooves of the record. As soon as the arrowheads are lined up, the lever extension 36a may be released, whereupon the lever will spring back downwardly, moving the lug 40 into one of the notches 38a and likewise allowing the pick-up unit 16 to move downwardly until its needle 19 is engaging the record 8.

The spacing of the annular sections 45 of the record is coordinated with the spacing of the notches 38a and with the spacing of the insulating recesses 27a so that when the lever 36 is first placed with its lug 40 in one of the notches 38a, the spring contact finger 25 is engaging one of the metallic portions of the contact plate 27 just to the right of an insulating recess 27a. The electric circuit of the motor 11 is therefore completed, and the motor starts to turn, driving the turntable 6 and the record 8. The pick-up unit 16 will reproduce the sound recorded on the record, which, as mentioned above, may be the same as the words printed on the open pages of the book. As the record turns, the pick-up head is moved across the record, against the tension of spring 43, while lever 36 remains stationary by means of the lost motion allowed in the pin-and-slot connection. The spring finger 25 moves with the pick-up head 16. When the pick-up head 16 reaches the end of the record section 45 corresponding to the page which is open in the book, the spring finger 25 reaches the next insulating recess 27a and breaks the circuit to the motor 11, so that the record stops. The person operating the apparatus will then normally turn over the page, thereby presenting a new page with an index 46 spaced downwardly on the page from the position of the index 46 on the page which has just been played. The operator will then reset the lever 36 to a new position corresponding to the position of the new index 46. When the right-hand end of lever 36 is lifted to accomplish this resetting, the pick-up unit 16 is lifted off the record as explained above, and the spring 43 then takes up the lost motion, so that when the lever 36 is introduced into the next notch, the needle 19 is at the beginning end of the next annular section 45 of the record. The spring finger 25 is at the same time moved past the insulating recess 27a which interrupted the circuit above, so that the apparatus immediately starts playing the next section of the record.

It should be understood that the sections of the record do not necessarily have to be played in successive order. The apparatus will play at any time any section of the record for which the lever 36 is set. If, after a section has been played, it is desired for the same section to be repeated, the operator has only to lift the right end of lever 36a far enough to lift the pick-up unit 16 and free the needle from the record. When this is done, the spring 43 resets the pick-up head 16 back to its position at the beginning end of the same record section 45, simultaneously resetting the spring finger 25 to its corresponding position, and thereby starting motor 11. Then, when the right-hand end of lever 36 is released again, the needle 19 will be brought into engagement with the record at the proper point to repeat the recorded words relating to the particular page for which the lever 36 is set.

The apparatus illustrated is adapted for use by very young children without damage to the device. As explained above, the apparatus can be turned in any angular position or inverted. The sound reproducing apparatus will continue to operate in any such position. Furthermore, if the child puts the apparatus down and goes away and leaves it, the record simply runs until the contact finger 25 hits the next insulated recess 27a, whereupon it stops. This is no loss of energy from the batteries due to the child's failure to turn off a switch.

While I have shown and described a single preferred embodiment of my invention, other modifications thereof will readily occur to those skilled in the art, and, I therefore, intend my invention to be limited only by the appended claims.

I claim:

1. A talking book, comprising a book having on at least some of its pages intelligence reproduced for sensual observation, a sound record with a sound track having recorded thereon for audible reproduction intelligence corresponding to that on the pages of the book, sound reproducing apparatus comprising a pick-up unit for operatively engaging said record, means for moving the record relative to the pick-up unit to reproduce the intelligence thereon audibly, means for engaging and disengaging the pick-up unit with the record, means including a movable control member for shifting said pick-up unit between spaced portions of the sound track without operatively engaging the intermediate portions, so as to bring said pick-up unit selectively into engagement with different parts of the record, means for supporting said book with one edge of the book adjacent the path of movement of said control member, said book having an index printed along the corresponding edge of at least some pairs of its facing pages, said index having its positional relationship along said edge coordinated with the positional relationship on the record of the intelligence corresponding to that on the pair of pages so that said control member is effective when aligned with said index to place said pick-up unit in operative engagement with the sound track at a point just preceding the recorded intelligence corresponding to that reproduced on said pair of facing pages.

2. A talking book as defined in claim 1, including an index on the control member matching the indexes printed in the book.

3. A talking book, comprising a book having on at least some of its pages intelligence reproduced for sensual observation, a sound record with a sound track having recorded thereon for audible reproduction intelligence corresponding to that on the pages of the book, sound reproducing apparatus comprising a pick-up unit for operatively engaging said record, means for moving the record relative to the pick-up unit to reproduce the intelligence thereon audiblly, manipulative means for engaging and disengaging the pick-up unit with the record to bring said pick-up unit selectively into engagement with different parts of the record respectively corresponding to the pages of the book, a casing for said sound reproducing apparatus including means adapted to support said book in open position on said casing, and means to stop said record at the end of each part.

4. A talking book as defined in claim 3, including means to clamp the book to the casing with its pages open, so that the book is held firmly in open position even though the casing is tilted from its normal position.

5. A talking book as defined in claim 3, in which said book supporting means is provided with an aperture accessible when the book is removed therefrom, and through which access may be gained to the interior of the casing to change the record on the sound reproducing apparatus.

6. A talking book as defined in claim 3, in which said record moving means comprises an electric motor and at least one battery for supplying electrical energy to said motor, and said book supporting means is provided with an aperture, accessible when the book is removed therefrom, through which access may be gained to the interior of the casing to change the battery.

7. A talking book as defined in claim 3, including a cover for enclosing a portion of said casing and a book supported on said casing.

8. A talking book as defined in claim 7, in which said cover is removable.

9. A talking book, comprising a book having on at least some of its pages intelligence reproduced for sensual observation, a sound record with a sound track having recorded thereon for audible reproduction intelligence corresponding to that on the pages of the book, the intelligence corresponding to each page being separated by blank portions of the sound track from the intelligence corresponding to the preceding and following pages, sound reproducing apparatus comprising a pick-up unit for operatively engaging said record, means for moving the record relative to the pick-up unit to reproduce the intelligence thereon audibly, means for engaging and disengaging the pick-up unit with the record, means for shifting said pick-up unit between spaced portions of the sound track without operatively engaging the intermediate portions, so as to bring said pick-up unit selectively into engagement with different parts of the record, settable means for operating both said engaging and disengaging means and said shifting means, and a casing for said sound reproducing apparatus including means adapted to support said book with one edge of the book adjacent the path of movement of said settable means, said book having an index printed along the corresponding edge of at least some pairs of its facing pages, said index having its positional relationship along said edge coordinated with the positional relationship on the record of the intelligence corresponding to that on the pair of pages so that said settable means is effective when aligned with said index to place said pick-up unit in operative engagement with the sound track in the blank portion preceding the recorded intelligence corresponding to that reproduced on said pair of facing pages and means to simultaneously start said record moving means to reproduce said corresponding recorded intelligence.

10. A talking book, comprising a book having on at least some of its pages intelligence reproduced for sensual observation, a sound record with a sound track having recorded thereon for audible reproduction intelligence corresponding to that on the pages of the book, the intelligence corresponding to each page being separated by blank portions of the sound track from the intelligence corresponding to the preceding and following pages, sound reproducing apparatus comprising a pick-up unit for operatively engaging said record, means for moving the record relative to the pick-up unit to reproduce the intelligence thereon audibly, means for engaging and disengaging the pick-up unit with the record, means for shifting said pick-up unit between spaced portions of the sound track without operatively engaging the intermediate portions, so as to bring said pick-up unit selectively into engagement with different parts of the record, a single manually movable control member for operating both said engaging and disengaging means and said shifting means, a casing for said sound reproducing apparatus, said record and said support, said casing including means adapted to support said book, and means for clamping said book to said support, both said clamping means and said spring means cooperating to maintain the apparatus operative when inverted from its normal position.

References Cited in the file of this patent

UNITED STATES PATENTS

| 2,323,638 | Wise | July 6, 1943 |
| 2,977,125 | Mallina | Mar. 28, 1961 |

FOREIGN PATENTS

| 254,715 | Great Britain | June 28, 1926 |
| 299,334 | Great Britain | Oct. 19, 1928 |
| 268,726 | Italy | Oct. 26, 1929 |